US012587789B2

(12) United States Patent
Ren et al.

(10) Patent No.: US 12,587,789 B2
(45) Date of Patent: Mar. 24, 2026

(54) COAXIAL SPEAKER

(71) Applicant: AAC Microtech (Changzhou) Co., Ltd., Changzhou (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 226 days.

(21) Appl. No.: 18/631,025

(22) Filed: Apr. 9, 2024

(65) Prior Publication Data

US 2025/0211909 A1 Jun. 26, 2025

Related U.S. Application Data

(63) Continuation of application No. PCT/CN2023/140461, filed on Dec. 21, 2023.

(51) Int. Cl.
*H04R 7/06* (2006.01)

(52) U.S. Cl.
CPC .................................... *H04R 7/06* (2013.01)

(58) Field of Classification Search
CPC . H04R 7/06; H04R 1/06; H04R 9/063; H04R 1/24; H04R 9/025
See application file for complete search history.

(56) References Cited

FOREIGN PATENT DOCUMENTS

CN 117119359 * 11/2023

* cited by examiner

*Primary Examiner* — Tuan D Nguyen
(74) *Attorney, Agent, or Firm* — Wiersch Law Group

(57) ABSTRACT

A coaxial speaker including a basket frame, a magnetic circuit system, a woofer vibration system, and a tweeter vibration system. The magnetic circuit system is provided with a cavity, a tweeter magnetic gap, and a woofer magnetic gap. The woofer vibration system includes a woofer diaphragm and a woofer voice coil. The tweeter vibration system includes a tweeter diaphragm and a tweeter voice coil. The woofer magnetic gap includes a first magnetic gap and a second magnetic gap, and the woofer voice coil includes a first voice coil and a second voice coil. The magnetic circuit system includes a magnetic yoke, a main magnetic portion, a first sub-magnetic portion, and a second sub-magnetic portion. The main magnetic portion includes a first magnet, a second magnet, a third magnet, and a main pole core. The main core includes a first plate portion, a second plate portion, and a wall portion.

14 Claims, 8 Drawing Sheets

COAXIAL SPEAKER

CROSS-REFERENCE TO RELATED APPLICATIONS

This application is a continuation of International Application No. PCT/CN2023/140461, filed on Dec. 21, 2023, the entire contents of which are incorporated herein by reference.

TECHNICAL FIELD

The present application relates to the field of electroacoustics, in particular to a coaxial speaker.

BACKGROUND

A coaxial speaker refers to a speaker that integrates a tweeter unit and a woofer unit, with both units coaxially arranged. The sound sources of the tweeter unit and the woofer unit in the coaxial speaker may be located on the front side of the speaker, i.e., the sound emission directions of the two speaker units are the same, or they may be located on front and back sides of the coaxial speaker, i.e., the sound emission directions of the two speaker units are not the same.

The coaxial speaker in the related art includes a basket frame, a magnetic circuit system and a woofer vibration system fixed to the basket frame, and a tweeter vibration system. The magnetic circuit system is provided with a cavity, a tweeter magnetic gap arranged around the cavity, and a woofer magnetic gap arranged around the tweeter magnetic gap. The magnetic circuit system includes a magnetic yoke and a main magnetic portion fixed to the magnetic yoke and surrounded by the woofer magnetic gap. The cavity extends through the magnetic yoke and main magnetic portion along the vibration direction, and the main magnetic portion forms the tweeter magnetic gap. The tweeter vibration system includes a tweeter diaphragm and a tweeter voice coil, the tweeter voice coil being inserted into the tweeter magnetic gap and driving the tweeter diaphragm to vibrate. The woofer vibration system includes a woofer diaphragm and a woofer voice coil configured to drive the woofer diaphragm to vibrate. The woofer voice coil includes three voice coils spaced apart along a length direction of the coaxial speaker. The cavity may be provided with inserting members electrically connecting the tweeter voice coil and the external circuit. Alternatively, when the tweeter diaphragm and the woofer diaphragm are located on different sides of the magnetic circuit system, the cavity may also be used as a sound conduction cavity to conduct the sound emitted by the tweeter diaphragm to another diaphragm located on the same side of the woofer diaphragm so as to make the coaxial speaker emit sound on the same side. However, this coaxial speaker has the following defects.

First, insufficient utilization of space on the inner side of the high-frequency voice coil, especially when designing for customer requirements such as PAD and PC, the space size on the inner side of the high-frequency voice coil is generally larger.

Second, the arrangement of three voice coils spaced along the length direction of the coaxial speaker not only results in an oversized size of the coaxial speaker in the length direction, making it unfavorable for speaker miniaturization, but also causes an imbalance in the drive of the low-frequency diaphragm in both the length and width directions of the coaxial speaker, thereby affecting sound performance.

Thus, it is necessary to study a coaxial speaker with a new structure.

SUMMARY

The present application aims to solve the problems of insufficient utilization of space on the inner side of the high-frequency voice coil, excessive size in the length direction, and imbalance in the drive of the low-frequency diaphragm in coaxial speakers by providing a coaxial speaker with a novel magnetic circuit structure.

In order to realize the above object, the present application provides a coaxial speaker, comprising:

a basket frame;

a magnetic circuit system fixed to the basket frame, the magnetic circuit system having a cavity, a tweeter magnetic gap, and a woofer magnetic gap;

a woofer vibration system, comprising a woofer diaphragm and a woofer voice coil configured to drive the woofer diaphragm to vibrate; and a tweeter vibration system, comprising a tweeter diaphragm and a tweeter voice coil inserted into the tweeter magnetic gap and configured to drive the tweeter diaphragm to vibrate;

wherein the woofer magnetic gap comprises a first magnetic gap and a second magnetic gap; the woofer voice coil comprises a first voice coil and a second voice coil; the magnetic circuit system comprises a magnetic yoke, a main magnetic portion, a first sub-magnetic portion, and a second sub-magnetic portion that are fixed to the magnetic yoke; the first sub-magnetic portion is arranged around the main magnetic portion and spaced apart from the main magnetic portion to form the first magnetic gap, and the first voice coil is inserted into the first magnetic gap to surround the main magnetic portion; the second sub-magnetic portion is arranged around the first sub-magnetic portion and spaced apart from the first sub-magnetic portion to form the second magnetic gap, and the second voice coil is inserted into the second magnetic gap to surround the first sub-magnetic portion and the first voice coil; the main magnetic portion comprises a first magnet, a second magnet and a third magnet that are arranged on the same side of the first magnet along a vibration direction of the tweeter diaphragm, and a main pole core; the second magnet is arranged around the third magnet; the main pole core comprises a first plate portion and a second plate portion that are spaced apart along the vibration direction, and a wall portion connecting the first plate portion and the second plate portion; the wall portion is inserted between the second magnet and the third magnet and spaced apart from the second magnet to form the tweeter magnetic gap; the first plate portion is sandwiched between the first magnet and the second magnet, and the third magnet is sandwiched between the second plate portion and the first magnet; the cavity is formed throughout the magnetic yoke, the first magnet, the third magnet and the second plate portion along the vibration direction.

As an improvement, the woofer diaphragm comprises an annular first folded ring, a second folded ring arranged around the first folded ring, and a dome connecting the first folded ring and the second folded ring; an inner peripheral edge of the first folded ring is fixed to the magnetic circuit system, and an outer peripheral edge of the second folded ring is fixed to the basket frame, wherein the first voice coil and the second voice coil are configured to drive the woofer diaphragm to vibrate through the dome.

As an improvement, the woofer vibration system further comprises a sub-flexible printed circuit; the sub-flexible printed circuit comprises a first connecting portion sandwiched between the outer peripheral edge of the second folded ring and the basket frame, a second connecting portion connected to the second voice coil, a plurality of elastic arms connecting the first connecting portion and the second connecting portion, a third connecting portion connected to the first voice coil, and a plurality of connecting arms connecting the second connecting portion and the third connecting portion, wherein the second connecting portion, the third connecting portion, and the connecting arms are fixed to the dome.

As an improvement, the second sub-magnetic portion is further fixed to the basket frame.

As an improvement, the first sub-magnetic portion is provided with a plurality of avoidance portions configured to avoid the plurality of connecting arms.

As an improvement, the plurality of avoidance portions separate the first sub-magnetic portion into a plurality of magnetic units.

As an improvement, both the first magnet and the second magnet are magnetized along the vibration direction, and the first magnet and the second magnet are arranged opposite to each other with the same polarity.

As an improvement, a magnetization direction of the first magnet is the same as a magnetization direction of the third magnet.

As an improvement, the third magnet is radially magnetized, the magnetization direction of the third magnet is perpendicular to the vibration direction, and the polarity of an end of the third magnet close to the second magnet is the same as the polarity of an end of the first magnet close to the second magnet.

As an improvement, the third magnet is in the shape of a continuous ring.

As an improvement, the third magnet comprises a plurality of spaced-apart magnets, and the plurality of magnets are distributed in a ring-like structure.

As an improvement, the magnetic yoke is fixed to a side of the first magnet away from the second magnet; an outer peripheral edge of the tweeter diaphragm is fixed to a side of the second magnet away from the first magnet by means of a frame, and the inner peripheral edge of the first folded ring is sandwiched between the frame and the second magnet.

As an improvement, the main magnetic portion further comprises a magnetic guide plate fixed to the side of the second magnet away from the first magnet; a positive projection of the magnetic guide plate on the tweeter diaphragm locates within a range of the tweeter diaphragm.

As an improvement, the cavity is provided with an inserting member, and the tweeter voice coil is electrically connected to an external circuit through the inserting member.

The beneficial effect of the present application is that: the main magnetic portion includes a first magnet, a second magnet and a third magnet that are arranged on the same side of the first magnet along a vibration direction of the tweeter diaphragm, and a main pole core; the second magnet is arranged around the third magnet; the main pole core comprises a first plate portion and a second plate portion that are spaced apart along the vibration direction, and a wall portion connecting the first plate portion and the second plate portion; the wall portion is inserted between the second magnet and the third magnet and spaced apart from the second magnet to form the tweeter magnetic gap; the first plate portion is sandwiched between the first magnet and the second magnet, and the third magnet is sandwiched between the second plate portion and the first magnet; the cavity is formed throughout the magnetic yoke, the first magnet, the third magnet and the second plate portion along the vibration direction. The structure of the main magnetic portion configured in this way maximizes the utilization of the space within the high-frequency voice coil to enhance the magnetic performance of the magnetic circuit system. Meanwhile, the low-frequency magnetic gap includes a first magnetic gap arranged around the main magnetic portion and a second magnetic gap arranged around the first magnetic gap, allowing the first voice coil inserted into the first magnetic gap to surround the main magnetic portion and the second voice coil inserted into the second magnetic gap to surround the first sub-magnetic portion. The magnetic circuit system and the woofer vibration system with such a configuration not only reduces the size of the speaker in the longitudinal direction but also achieves balanced driving of the low-frequency diaphragm by the first and second voice coils with a coaxial and annular arrangement.

DETAILED DESCRIPTION OF THE EMBODIMENTS

The present application is described in detail below in combination with FIGS. 1 to 8.

Figure 5:
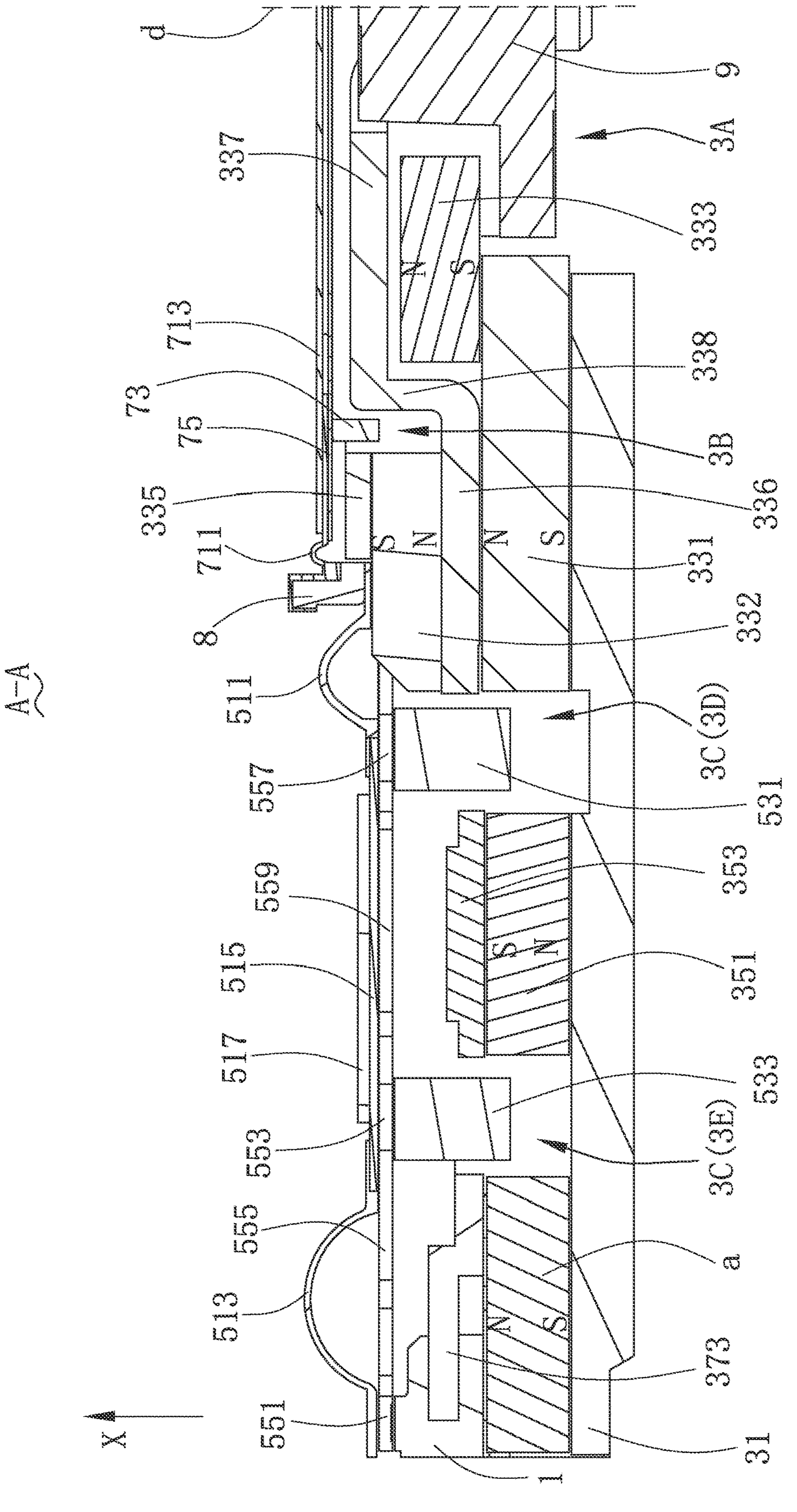
FIG. 5 is a sectional view of the coaxial speaker shown in FIG. 4 along line A-A, in which only one of the two portions symmetrical relative to the dashed line d is retained.
Figure 6:
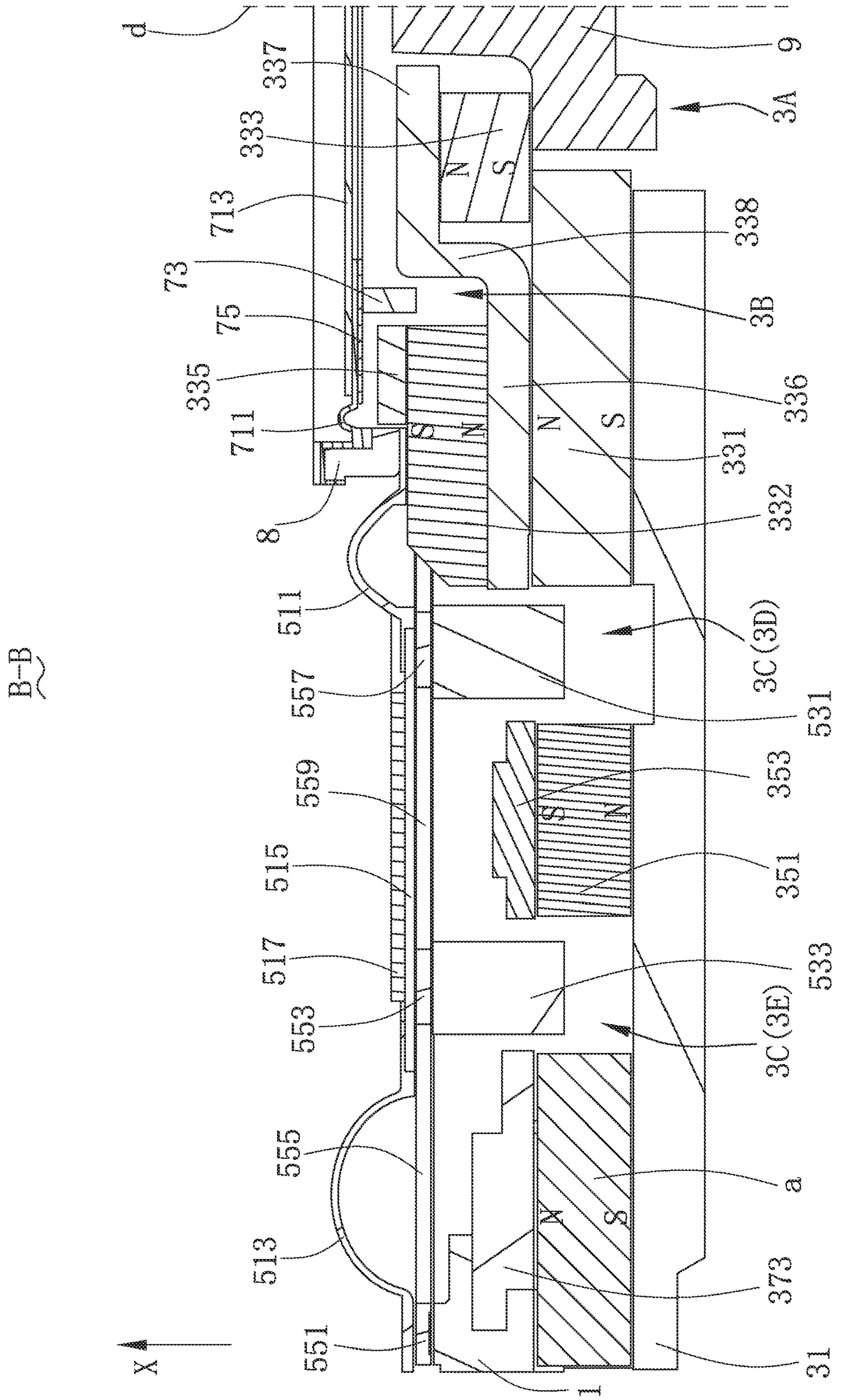
FIG. 6 is a sectional view of the coaxial speaker shown in FIG. 4 along line B-B, in which only one of the two portions symmetrical relative to the dashed line d is retained.
Figure 7:
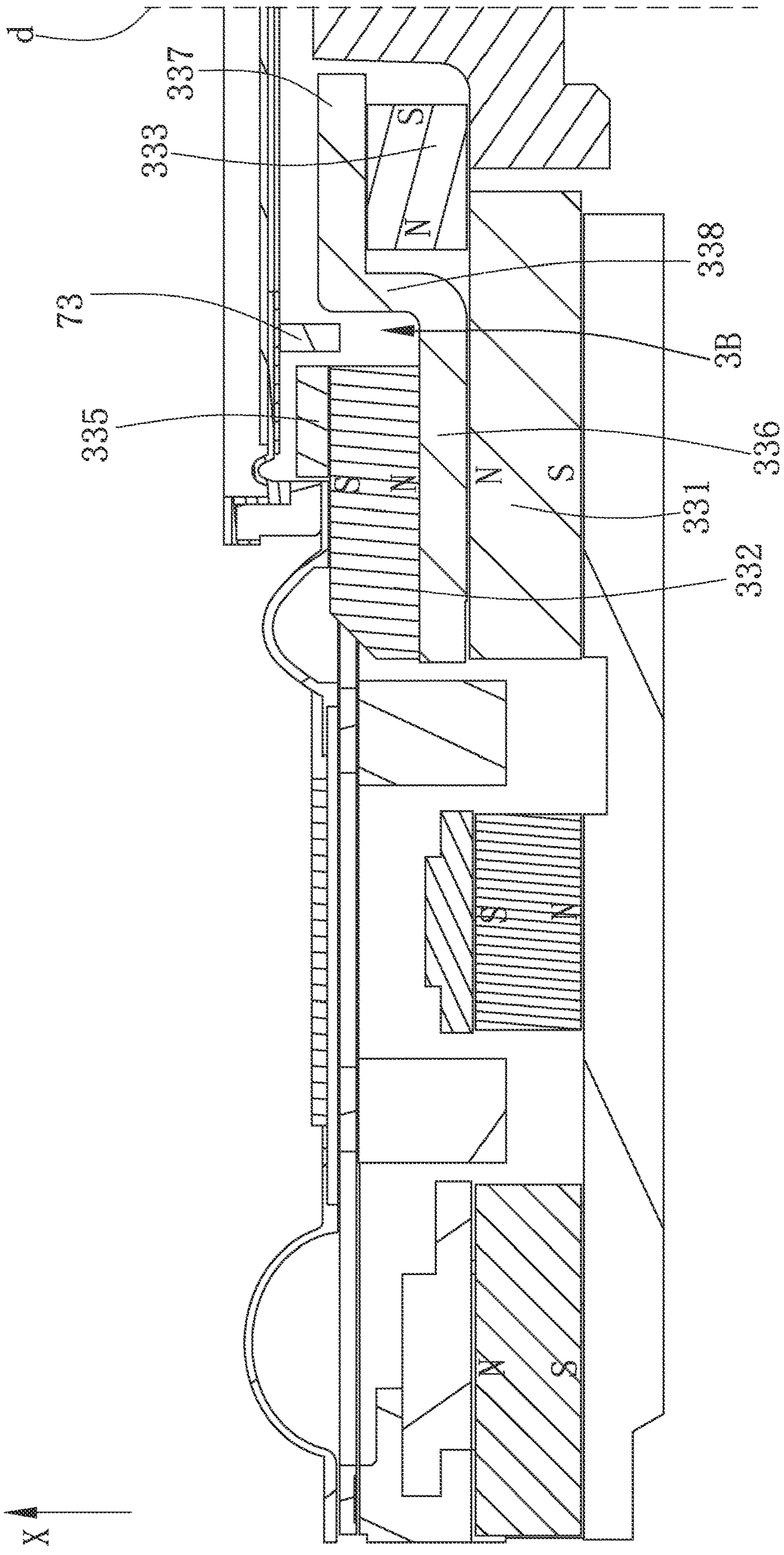
FIG. 7 is a sectional view of the coaxial speaker according to Embodiment Two of the present application, in which only one of the two portions symmetrical relative to the dashed line d is retained.
Figure 8:
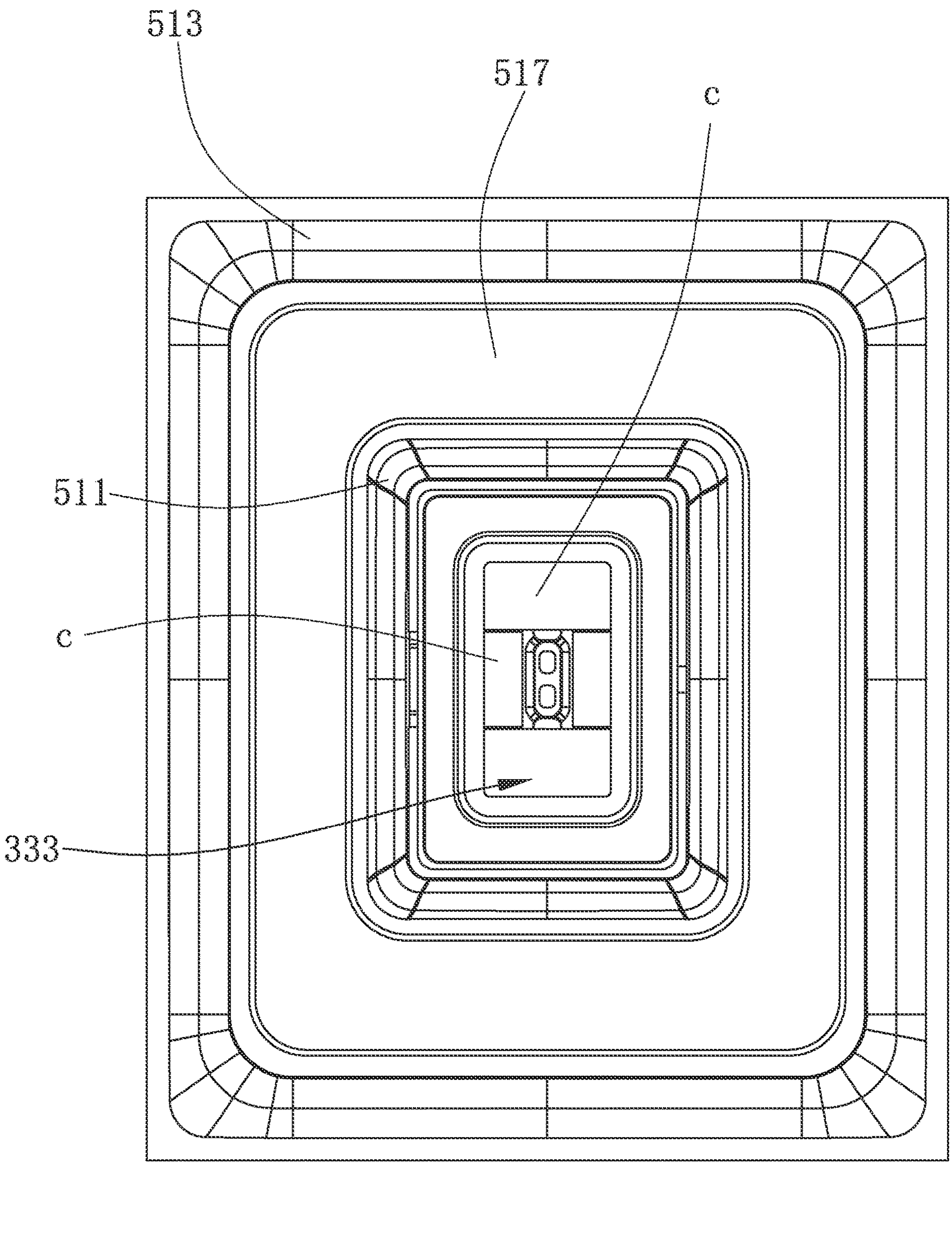
FIG. 8 is a top view of the coaxial speaker according to Embodiment Three of the present application with a tweeter vibration system and the main pole core removed.

As shown in FIGS. 5 to 7, it is defined that the thickness direction of the coaxial speaker of the present application is a vibration direction X. The vibration direction X includes a positive direction and a negative direction. It is defined that the positive direction of the vibration direction X is a direction indicated by an arrow of the vibration direction X, and the negative direction of the vibration direction X is a direction opposite to the direction indicated by the arrow of the vibration direction X.

Embodiment One

As shown in FIGS. 1 to 7, the coaxial speaker of the present application includes a basket frame 1, a magnetic circuit system 3 fixed to the basket frame 1, a woofer vibration system 5, and a tweeter vibration system 7. The woofer vibration system 5 is arranged around an outer side of the tweeter vibration system 7 and coaxially arranged with the tweeter vibration system 7. The magnetic circuit system 3 is configured to drive the woofer vibration system 5 to emit a low-frequency sound, and the magnetic circuit system 3 is configured to drive the tweeter vibration system 7 to emit a high-frequency sound, so that the combination of the woofer vibration system 5 and the tweeter vibration system 7 can increase the frequency range of the sound produced by the coaxial speaker.

The basket frame 1 is roughly rectangular in shape, and conductive terminals (not shown in the figures) are molded on the basket frame 1 to electrically connect to external circuits.

The magnetic circuit system 3 has a cavity 3A, a tweeter magnetic gap 3B, and a woofer magnetic gap 3C.

The tweeter magnetic gap 3B is arranged around the cavity 3A.

The woofer magnetic gap 3C includes a first magnetic gap 3D and a second magnetic gap 3E.

the first magnetic gap 3D is arranged around the tweeter magnetic gap 3B.

The second magnetic gap 3E is arranged around the first magnetic gap 3D.

It should be noted that the cavity 3A, the tweeter magnetic gap 3B, the first magnetic gap 3D, and the second magnetic gap 3E are arranged coaxially.

The magnetic circuit system 3 includes a magnetic yoke 31, a main magnetic portion 33, a first sub-magnetic portion 35, and a second sub-magnetic portion 37 that are fixed to the magnetic yoke 31.

The tweeter magnetic gap 3B is formed on the main magnetic portion 33.

The first sub-magnetic portion 35 is arranged around the main magnetic portion 33 and is spaced apart from the main magnetic portion 33 to form a first magnetic gap 3D. That is, both the tweeter magnetic gap 3B and the main magnetic portion 33 are arranged around the first magnetic gap 3D.

The second sub-magnetic portion 37 is arranged around the first sub-magnetic portion 35 and is spaced apart from the first sub-magnetic portion 35 to form a second magnetic gap 3E. That is, the first magnetic gap 3D and the first sub-magnetic portion 35 are both surrounded by the second magnetic gap 3E.

The second sub-magnetic portion 37 is further fixed to the basket frame 1 to enable the magnetic circuit system 3 to be fixed to the basket frame 1.

The main magnetic portion 33 includes a first magnet 331, a second magnet 332 and a third magnet 333 arranged on the same side of the first magnet 331 along the vibration direction X, and a main pole core 334.

The second magnet 332 is arranged around the third magnet 333.

The main pole core 334 includes a first plate portion 336 and a second plate portion 337 spaced apart along the vibration direction X and a wall portion 338 connecting the first plate portion 336 and the second plate portion 337.

The first plate portion 336 is sandwiched between the first magnet 331 and the second magnet 332.

The wall portion 338 is sandwiched between the second magnet 332 and the third magnet 333 and spaced from the second magnet 332 to form the tweeter magnetic gap 3B.

The third magnet 333 is sandwiched between the second plate portion 337 and the first magnet 331.

The cavity 3A is formed throughout the magnetic yoke 31, the first magnet 331, the third magnet 333, and the second plate portion 337 along the vibration direction X.

Figure 1:
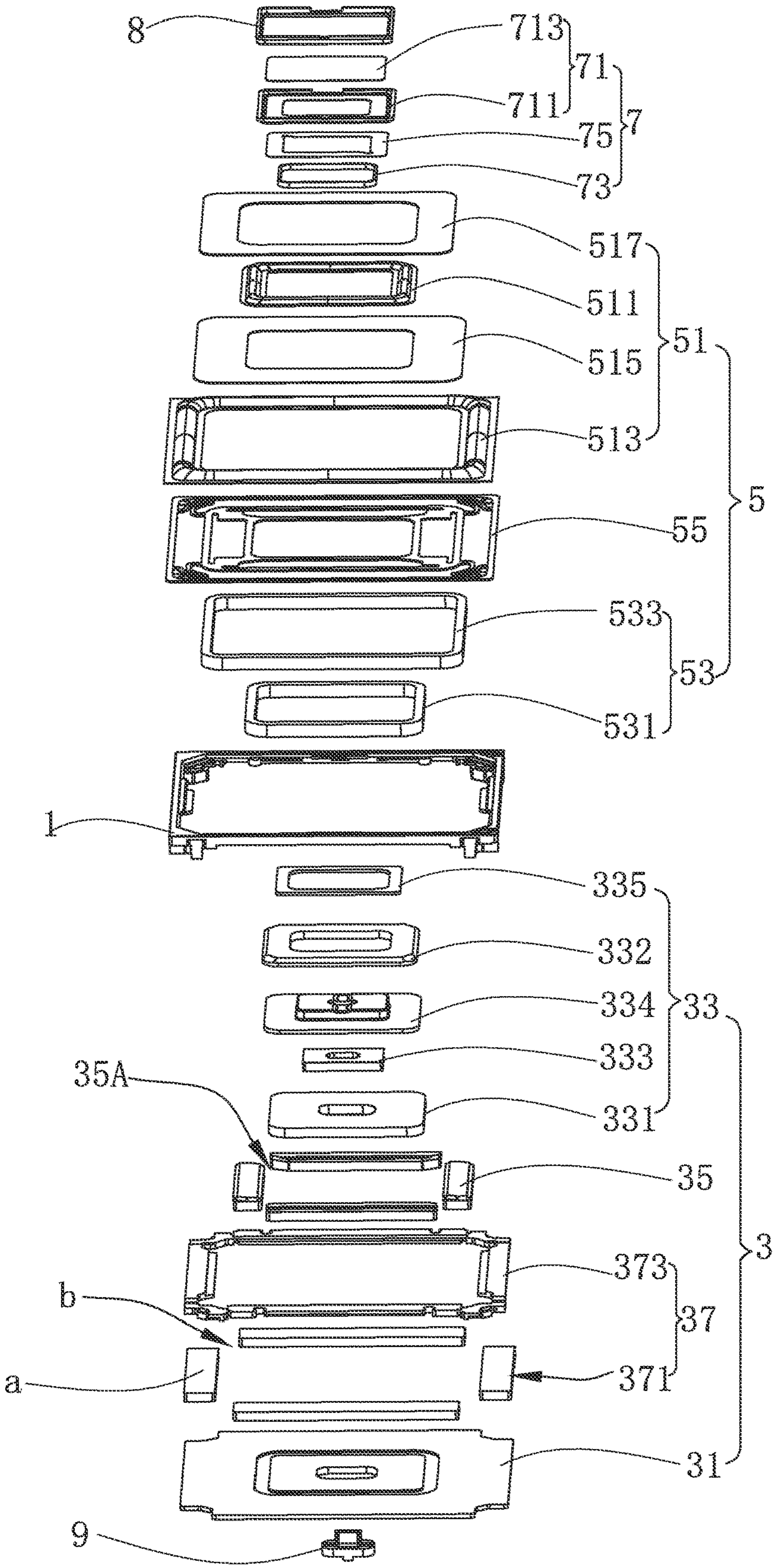
FIG. 1 is a three-dimensional exploded view of a coaxial speaker according to Embodiment One of the present application.
Figure 2:
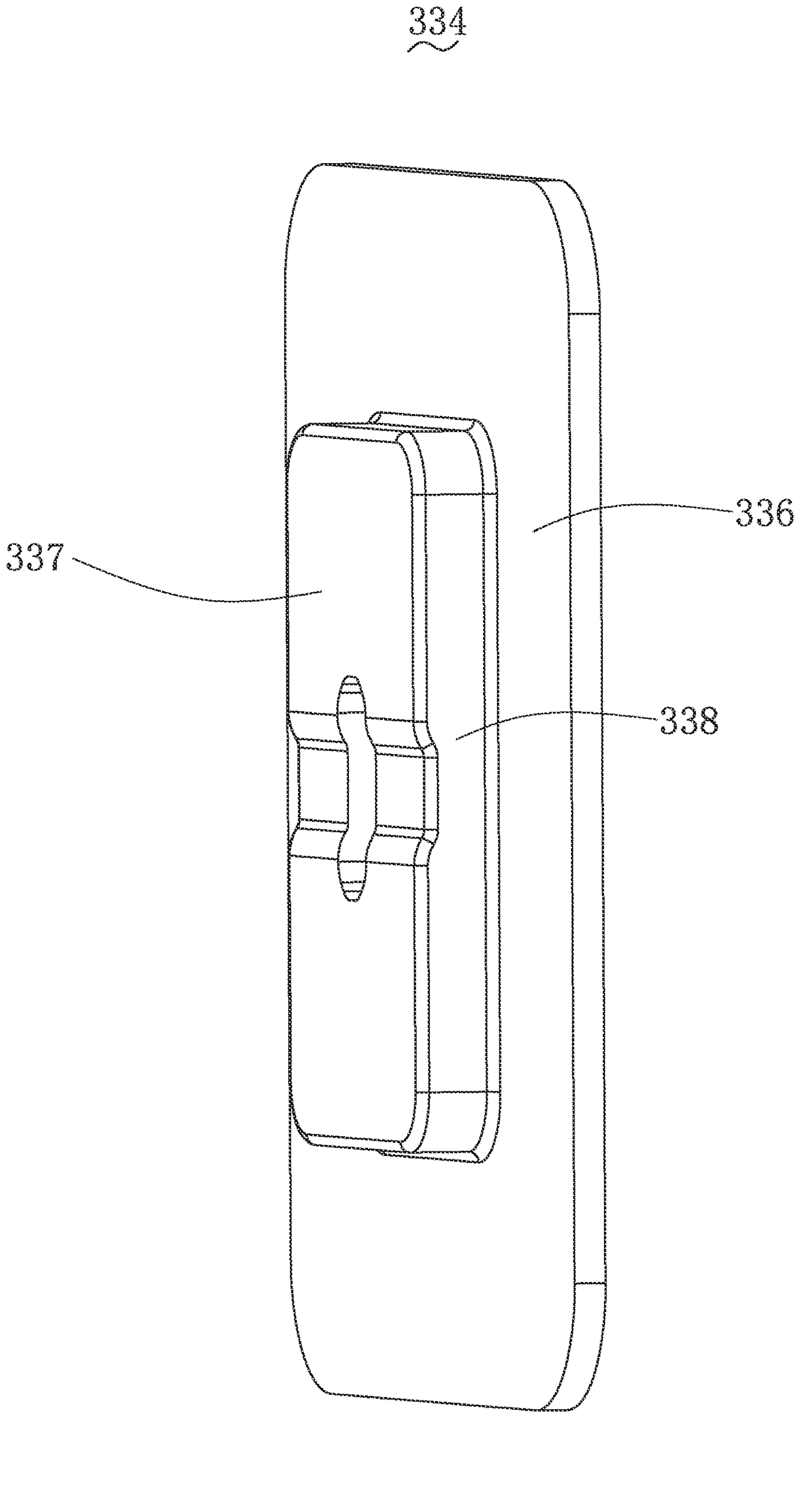
FIG. 2 is a structural schematic diagram of a main pole core in the coaxial speaker shown in FIG. 1.
Figure 3:
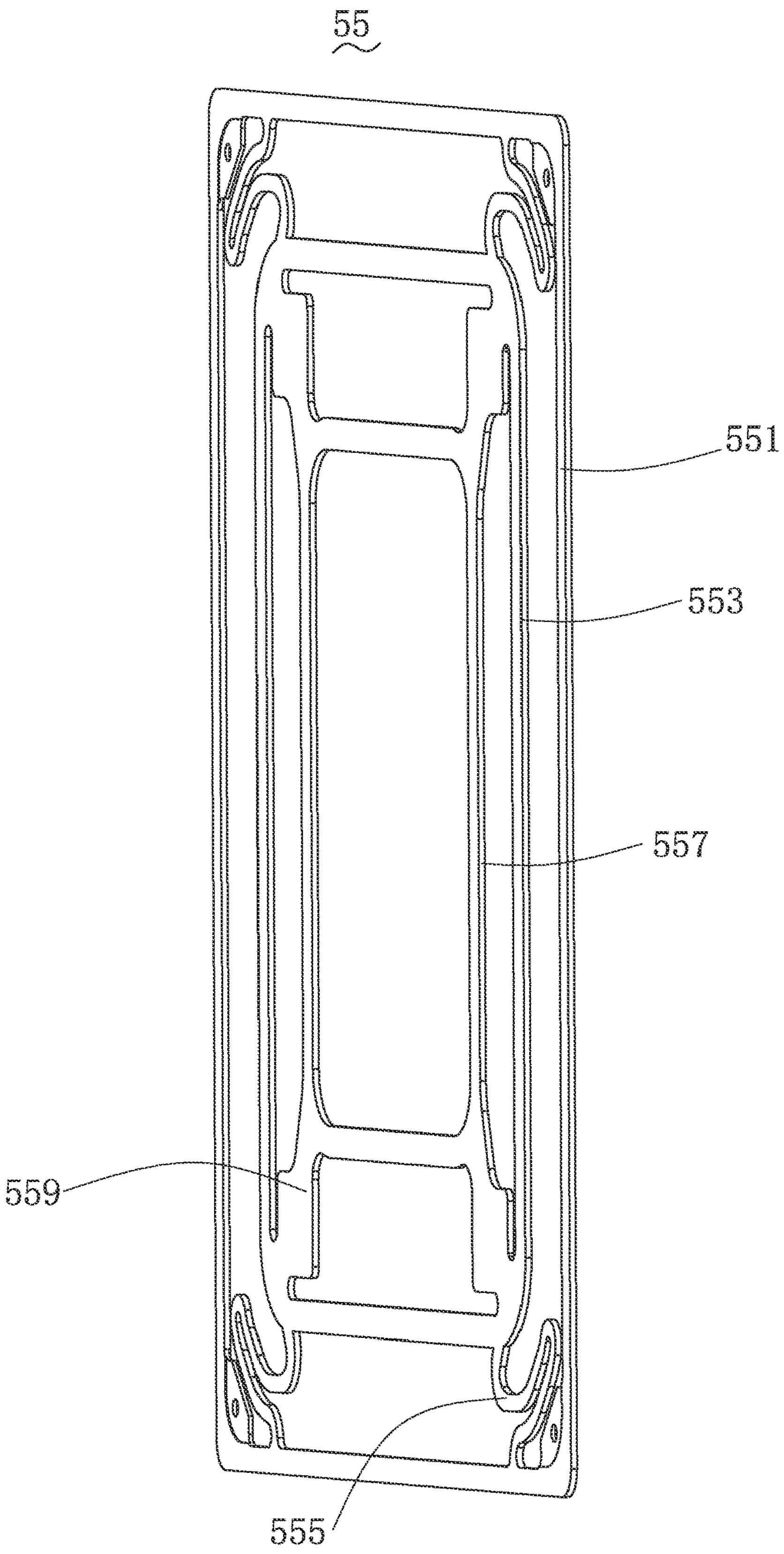
FIG. 3 is a structural schematic diagram of a sub-flexible printed circuit in the coaxial speaker shown in FIG. 1.
Figure 4:
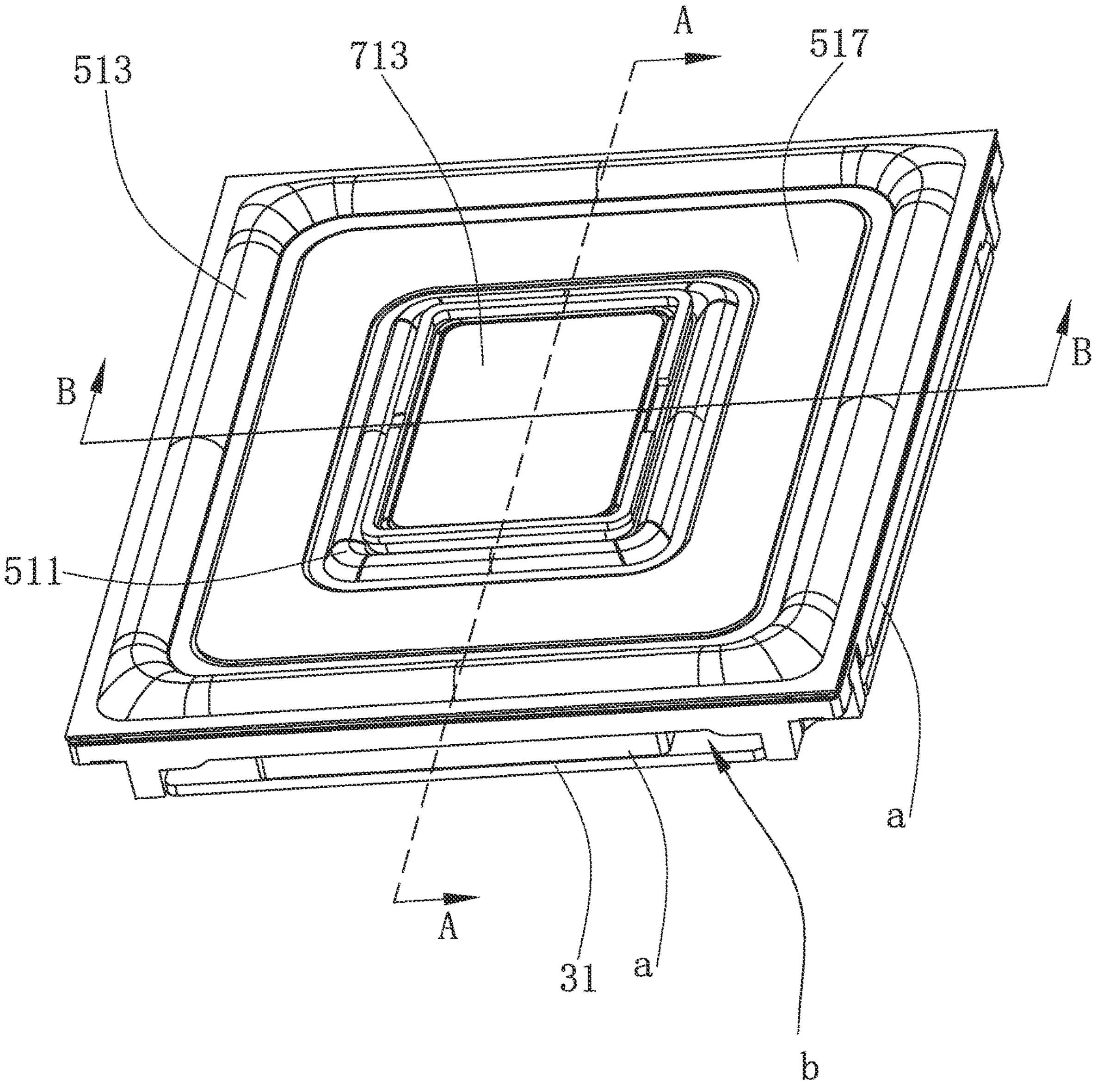
FIG. 4 is a structural schematic diagram of the coaxial speaker shown in FIG. 1 after assembly.

As shown in FIGS. 1, 5, and 6, the magnetic yoke 31, the first magnet 331, the third magnet 333, and the second plate portion 337 are all continuous annular structures.

It should be noted that the magnetic yoke 31, the first magnet 331, the third magnet 333 and the second plate portion 337 are arranged coaxially.

In this embodiment, the first magnet 331 and the second magnet 332 are both magnetized along the vibration direction X, and the first magnet 331 and the second magnet 332 are arranged opposite to each other with the same polarity. A magnetization direction of the first magnet 331 is the same as a magnetization direction of the third magnet 333.

That is, one of the first magnet 331 and the second magnet 332 is magnetized along the positive direction of the vibration direction X, and the other thereof is magnetized along the negative direction of the vibration direction X. FIGS. 5 and 6 illustrate one way of magnetic polarity distribution of the first magnet 331, the second magnet 332, and the third magnet 333.

The tweeter vibration system 7 includes a tweeter diaphragm 71 and a tweeter voice coil 73 inserted into the tweeter magnetic gap 3B and configured to drive the tweeter diaphragm 71 to vibrate.

In this embodiment, as shown in FIGS. 5 and 6, the magnetic yoke 31 is fixed to a side of the first magnet 331 away from the second magnet 332, and an outer peripheral edge of the tweeter diaphragm 71 is fixed to a side of the second magnet 332 away from the first magnet 331 by a frame 8.

In this embodiment, the main magnetic portion 33 further includes a magnetic guide plate 335 fixed to the side of the second magnet 332 away from the first magnet 331.

The magnetic guide plate 335 has an annular structure. A positive projection of the magnetic guide plate 335 on the tweeter diaphragm 71 falls within a range of the tweeter diaphragm 71.

The tweeter diaphragm 71 includes a diaphragm body 711 and a reinforcement plate 713 fixed to a side of the diaphragm body 711 away from the magnetic circuit system 3.

As shown in FIGS. 5 and 6, an outer peripheral edge of the diaphragm body 711 is fixed to the side of the second magnet 332 away from the first magnet 331 by the frame 8.

The cavity 3A is provided with an inserting member 9, and the tweeter voice coil 73 is electrically connected to the external circuit through the inserting member 9.

Conductive terminals (not shown in the figures) are embedded in the inserting member 9 and electrically connect the tweeter voice coil 73 to the external circuit.

In this embodiment, the tweeter vibration system 7 further includes a main flexible printed circuit 75 fixed to the side of the diaphragm body 711 away from the magnetic circuit system 3. The tweeter voice coil 73 is fixed to the main flexible printed circuit 75 and is electrically connected to the main flexible printed circuit 75. The main flexible printed circuit 75 is also electrically connected to the conductive terminals of the inserting member 9, such that the tweeter voice coil 73 is electrically connected to the conductive terminals of the inserting member 9 (not shown in the figures).

The woofer vibration system 5 includes a woofer diaphragm 51 and a woofer voice coil 53 configured to drive the woofer diaphragm 51 to vibrate.

An outer peripheral edge of the woofer diaphragm 51 is fixed to the basket frame 1, and its inner peripheral edge is fixed to the magnetic circuit system 3.

As shown in FIGS. 5 and 6, the woofer diaphragm 51 includes an annular first folded ring 511, a second folded ring 513 arranged around the first folded ring 511, and a dome 515 connecting the first folded ring 511 and the second folded ring 513. An inner peripheral edge of the first folded ring 511 is sandwiched between the second magnet 332 and the frame 8 so that the inner peripheral edge of the first folded ring 511 is fixed to the magnetic circuit system 3, and an outer peripheral edge of the second folded ring 513 is fixed to the basket frame 1.

It should be noted that the first folded ring 511, the second folded ring 513 and the tweeter diaphragm 71 are arranged coaxially.

In this embodiment, the woofer diaphragm 51 further includes a counterweight member 517 fixed to a side of the dome 515 away from the woofer voice coil 53. The counterweight member 517 is in the shape of a ring.

The woofer voice coil 53 includes a first voice coil 531 and a second voice coil 533. The first voice coil 531 is inserted into the first magnetic gap 3D to arrange around the main magnetic portion 33, and the second voice coil 533 is inserted into the second magnetic gap 3E to arrange around the first sub-magnetic portion 35 and the first voice coil 531. The first voice coil 531 and the second voice coil 533 are configured to drive the woofer diaphragm 51 to vibrate through the dome 515. That is, the first voice coil 531 and the second voice coil 533 need to be directly or indirectly connected to the dome 515 to enable the first voice coil 531 and the second voice coil 533 to drive the woofer diaphragm 51 to vibrate through the dome 515.

It should be noted that the first voice coil 531 and the second voice coil 533 are arranged coaxially.

In this embodiment, the woofer vibration system 5 further includes a sub-flexible printed circuit 55. The sub-flexible printed circuit 55 includes a first connecting portion 551 sandwiched between an outer peripheral edge of the second folded ring 513 and the basket frame 1, a second connecting portion 553 connected to the second voice coil 533, a plurality of elastic arms 555 connecting the first connecting portion 551 and the second connecting portion 553, a third connecting portion 557 connected to the first voice coil 531, and a plurality of connecting arms 559 connecting the second connecting portion 553 and the third connecting portion 557. The second connecting portion 553, the third connecting portion 557, and the connecting arms 559 are all fixed to the dome 515 to allow the first voice coil 531 and the second voice coil 533 to be connected to the dome 515 through the sub-flexible printed circuit 55. The woofer vibration system 5 with dual voice coils not only increases the electromagnetic force compared to the woofer vibration system with a single voice coil, but also the coaxial tandem design of the dual voice coils in the woofer portion provides more balanced support for the woofer diaphragm 51.

That is, the outer peripheral edge of the second folded ring 513 is indirectly fixed to the basket frame 1 through the first connecting portion 551.

It should be noted that the connection between the second connecting portion 553 and the second voice coil 533 and the connection between the third connecting portion 557 and the first voice coil 531 include both fixed connections and electrical connections. The first connecting portion 551 is further electrically connected to conductive terminals molded on the basket frame 1 to allow the first voice coil 531 and the second voice coil 533 to be electrically connected to the external circuits through the sub-flexible printed circuit 55 and the conductive terminals molded on the basket frame 1.

The first sub-magnetic portion 35 is provided with a plurality of avoidance portions 35A configured to avoid the plurality of connecting arms 559.

The plurality of avoidance portions 35A separates the first sub-magnetic portion 35 into a plurality of magnetic units.

As shown in FIG. 1, there are four avoidance portions 35A, and accordingly, the first sub-magnetic portion 35 is separated into four magnetic units.

Each magnetic unit includes a fourth magnet 351 fixed to the magnetic yoke 31 and a first pole core 353 stacked on the fourth magnet 351.

The second sub-magnetic portion 37 includes a fifth magnet 371 fixed to the magnetic yoke 31 and a second pole core 373 fixed to a side of the fifth magnet 371 away from the magnetic yoke 31. The second pole core 373 is further fixed to the basket frame 1 to allow the magnetic circuit system 3 to be fixed to the basket frame 1.

The second pole core 373 is in the form of a continuous ring.

The fifth magnet 371 includes four magnets a spaced apart, and the four magnets a are distributed in a rectangular shape. A leakage channel b is formed between two adjacent magnets a to expand the rear chamber volume of the woofer section.

It should be noted that the ring structure described above refers to a structure with an empty center independent of the shape of its periphery.

Embodiment Two

As shown in FIG. 7, Embodiment Two differs from Embodiment One only in that: the third magnet 333 is radially magnetized, and the magnetization direction of the third magnet 333 is perpendicular to the vibration direction X. The polarity of an end of the third magnet 333 close to the second magnet 332 is the same as the polarity of an end of the first magnet 331 close to the second magnet 332. FIG. 7 illustrates one type of magnetic polarity distribution of the first magnet 331, the second magnet 332, and the third magnet 333.

Embodiment Three

As shown in 8, Embodiment Three differs from Embodiment One and Embodiment Two only in that: the third magnet 333 includes a plurality of spaced-apart magnets c, and the plurality of magnets c are distributed in a ring-like manner.

It should be noted that in other embodiments, the magnetic yoke may also be fixed to the side of the second magnet away from the first magnet, i.e., the opening of the tweeter magnetic gap is faced toward the magnetic yoke, and accordingly, the magnetic guide plate is fixed to a side of the first magnet away from the second magnet, and the outer peripheral edge of the tweeter diaphragm is fixed to a side of the magnetic yoke away from the main magnetic portion.

Described above are only embodiments of the present application. It should be noted herein that improvements may be made for those of ordinary skill in the art without departing from the inventive conception of the present application, but these fall within the protection scope of the present application.

What is claimed is:

1. A coaxial speaker, comprising:
a basket frame;
a magnetic circuit system fixed to the basket frame, the magnetic circuit system having a cavity, a tweeter magnetic gap, and a woofer magnetic gap;
a woofer vibration system, comprising a woofer diaphragm and a woofer voice coil configured to drive the woofer diaphragm to vibrate; and
a tweeter vibration system, comprising a tweeter diaphragm and a tweeter voice coil inserted into the tweeter magnetic gap and configured to drive the tweeter diaphragm to vibrate;
wherein the woofer magnetic gap comprises a first magnetic gap and a second magnetic gap; the woofer voice coil comprises a first voice coil and a second voice coil; the magnetic circuit system comprises a magnetic yoke, a main magnetic portion, a first sub-magnetic portion, and a second sub-magnetic portion that are fixed to the magnetic yoke; the first sub-magnetic portion is arranged around the main magnetic portion and spaced apart from the main magnetic portion to form the first magnetic gap, and the first voice coil is inserted into the first magnetic gap to surround the main magnetic portion; the second sub-magnetic portion is arranged around the first sub-magnetic portion and spaced apart from the first sub-magnetic portion to form the second magnetic gap, and the second voice coil is inserted into the second magnetic gap to surround the first sub-magnetic portion and the first voice coil; the main magnetic portion comprises a first magnet, a second magnet and a third magnet that are arranged on the same side of the first magnet along a vibration direction of the tweeter diaphragm, and a main pole core; the second magnet is arranged around the third magnet; the main pole core comprises a first plate portion and a second plate portion that are spaced apart along the vibration direction, and a wall portion connecting the first plate portion and the second plate portion; the wall portion is inserted between the second magnet and the third magnet and spaced apart from the second magnet to form the tweeter magnetic gap; the first plate portion is sandwiched between the first magnet and the second magnet, and the third magnet is sandwiched between the second plate portion and the first magnet; the cavity is formed throughout the magnetic yoke, the first magnet, the third magnet and the second plate portion along the vibration direction.

2. The coaxial speaker of claim 1, wherein the woofer diaphragm comprises an annular first folded ring, a second folded ring arranged around the first folded ring, and a dome connecting the first folded ring and the second folded ring; an inner peripheral edge of the first folded ring is fixed to the magnetic circuit system, and an outer peripheral edge of the second folded ring is fixed to the basket frame, wherein the first voice coil and the second voice coil are configured to drive the woofer diaphragm to vibrate through the dome.

3. The coaxial speaker of claim 2, wherein the woofer vibration system further comprises a sub-flexible printed circuit; the sub-flexible printed circuit comprises a first connecting portion sandwiched between the outer peripheral edge of the second folded ring and the basket frame, a second connecting portion connected to the second voice coil, a plurality of elastic arms connecting the first connecting portion and the second connecting portion, a third connecting portion connected to the first voice coil, and a plurality of connecting arms connecting the second connecting portion and the third connecting portion, wherein the second connecting portion, the third connecting portion, and the connecting arms are fixed to the dome.

4. The coaxial speaker of claim 2, wherein the magnetic yoke is fixed to a side of the first magnet away from the second magnet; an outer peripheral edge of the tweeter diaphragm is fixed to a side of the second magnet away from the first magnet by means of a frame, and the inner peripheral edge of the first folded ring is sandwiched between the frame and the second magnet.

5. The coaxial speaker of claim 4, wherein the main magnetic portion further comprises a magnetic guide plate fixed to the side of the second magnet away from the first magnet; a positive projection of the magnetic guide plate on the tweeter diaphragm locates within a range of the tweeter diaphragm.

6. The coaxial speaker of claim 1, wherein the second sub-magnetic portion is further fixed to the basket frame.

7. The coaxial speaker of claim 1, wherein the first sub-magnetic portion is provided with a plurality of avoidance portions configured to avoid the plurality of connecting arms.

8. The coaxial speaker of claim 7, wherein the plurality of avoidance portions separate the first sub-magnetic portion into a plurality of magnetic units.

9. The coaxial speaker of claim 1, wherein both the first magnet and the second magnet are magnetized along the vibration direction, and the first magnet and the second magnet are arranged opposite to each other with the same polarity.

10. The coaxial speaker of claim 9, wherein a magnetization direction of the first magnet is the same as a magnetization direction of the third magnet.

11. The coaxial speaker of claim 9, wherein the third magnet is radially magnetized, the magnetization direction of the third magnet is perpendicular to the vibration direction, and the polarity of an end of the third magnet close to the second magnet is the same as the polarity of an end of the first magnet close to the second magnet.

12. The coaxial speaker of claim 1, wherein the third magnet is in the shape of a continuous ring.

13. The coaxial speaker of claim 1, wherein the third magnet comprises a plurality of spaced-apart magnets, and the plurality of magnets are distributed in a ring-like structure.

14. The coaxial speaker of claim 1, wherein the cavity is provided with an inserting member, and the tweeter voice coil is electrically connected to an external circuit through the inserting member.

* * * * *